United States Patent
Roseen et al.

(10) Patent No.: US 8,872,043 B2
(45) Date of Patent: Oct. 28, 2014

(54) ELECTRIC CONNECTION DEVICE AND A METHOD OF PRODUCING SUCH A DEVICE

(75) Inventors: Patrik Roseen, Västerås (SE); Robert Espeseth, Skien (NO)

(73) Assignee: ABB Research Ltd., Zürich (CH)

( * ) Notice: Subject to any disclaimer, the term of this patent is extended or adjusted under 35 U.S.C. 154(b) by 757 days.

(21) Appl. No.: 12/297,090

(22) PCT Filed: Apr. 12, 2007

(86) PCT No.: PCT/EP2007/053557
§ 371 (c)(1),
(2), (4) Date: Mar. 17, 2009

(87) PCT Pub. No.: WO2007/118839
PCT Pub. Date: Oct. 25, 2007

(65) Prior Publication Data
US 2009/0211805 A1 Aug. 27, 2009

(30) Foreign Application Priority Data
Apr. 13, 2006 (EP) .................... 06112607

(51) Int. Cl.
*H02G 3/18* (2006.01)
*H02G 15/068* (2006.01)
*H02G 15/22* (2006.01)

(52) U.S. Cl.
CPC ............ *H02G 15/068* (2013.01); *H02G 15/22* (2013.01)
USPC ............ 174/650; 439/198; 248/56; 174/668; 174/667; 174/662

(58) Field of Classification Search
USPC .............. 174/650, 668, 667, 652, 68.1, 36; 439/198; 248/56; 52/749.1
See application file for complete search history.

(56) References Cited

U.S. PATENT DOCUMENTS

| | | | | |
|---|---|---|---|---|
| 2,894,054 A | * | 7/1959 | Cameron et al. | 174/21 R |
| 3,178,505 A | * | 4/1965 | Van Sickle | 174/31 R |
| 3,234,322 A | | 2/1966 | Van Sickle | |
| 3,806,625 A | * | 4/1974 | Long | 174/31 R |
| 3,876,820 A | * | 4/1975 | Mashikian | 174/19 |
| 3,913,407 A | * | 10/1975 | Hanff et al. | 73/590 |
| 3,926,774 A | * | 12/1975 | Watson et al. | 204/667 |
| 4,431,859 A | * | 2/1984 | Kishida | 174/31 R |
| 5,214,240 A | * | 5/1993 | McArdle | 174/11 BH |
| 5,387,448 A | * | 2/1995 | Watanabe et al. | 428/34.7 |
| 5,531,459 A | * | 7/1996 | Fukuda et al. | 277/606 |

FOREIGN PATENT DOCUMENTS

| | | |
|---|---|---|
| DE | 293 632 C | 12/1912 |
| EP | 1 496 576 A | 1/2005 |
| GB | 233 880 | 5/1925 |

OTHER PUBLICATIONS

International Search Report, dated Jul. 17, 2007, issued in connection with counterpart International Application No. PCT/EP2007/053557.

* cited by examiner

*Primary Examiner* — Dhirubhai R Patel
(74) *Attorney, Agent, or Firm* — Dilworth & Barrese, LLP

(57) ABSTRACT

A device for electric connection to an energy supply conductor for intermediate and high voltage. The device includes an insulation part and an electrically conducting voltage-carrying part. The voltage-carrying part is surrounded by an outer shell formed by the insulation part. The insulation part is formed by a thermoplastic polymer. At least along a part of the length of the voltage-carrying part, the outer shell extends with a spacing between its inner periphery and the outer periphery of the voltage-carrying part.

20 Claims, 2 Drawing Sheets

ELECTRIC CONNECTION DEVICE AND A METHOD OF PRODUCING SUCH A DEVICE

CROSS-REFERENCE TO RELATED APPLICATIONS

This application claims priority to European patent application number 06112607.4 filed 13 Apr. 2006 and is the national phase under 35 U.S.C. §371 of PCT/EP2007/053557 filed 12 Apr. 2007.

TECHNICAL FIELD

The present invention relates to a device for electric connection to an energy supply conductor for intermediate and high voltage, comprising an insulation part and a voltage-carrying part adapted to be connected to an intermediate or high-voltage source, wherein the voltage-carrying part is surrounded by a shell formed by said insulation part and wherein the insulation part is formed by a thermoplastic polymer.

The invention also relates to a method of producing a device for electric connection to an energy supply conductor for intermediate and high voltage, wherein an outer shell formed by a thermoplastic resin is moulded around a voltage-carrying part to be connected to an intermediate or high-voltage source.

The electric connection device is typically a cable connection device which is firmly attached to a wall element and adapted to receive and be connected to a mating end of a cable for the transmission of electric power within the middle and high voltage region, preferably from 1 kV up to 150 kV. Normally the voltage-carrying part is a contact part that has a protruding end that is connected to a mating end of the cable, whereupon an outer further insulating member, normally made of rubber and earthed, is positioned like a sleeve or sock surrounding the mating ends of the contact part and cable.

Alternatively, the device defines a canister adapted to receive a fuse connected to an intermediate or high voltage source, by which the voltage-carrying part comprises a shield made of an electrically conducting material arranged for the purpose of suppressing an electric field in a specific region inside the canister. In such a case the voltage-carrying part is normally connected to a current-conducting part of the fuse or any current-conducting part connected thereto, thereby receiving an intermediate or high voltage but not being directly involved in conducting any current.

Further applications are, off course, conceivable and within the scope of the invention. However the invention will primarily be described with reference to the above examples.

BACKGROUND OF THE INVENTION

Electric cable connection devices like the one initially defined have, according to prior art, used an insulation part made of a thermosetting resin like epoxy, moulded directly on and forming a sleeve or bushing on the contact part and leaving a free end of the contact part for connection to a mating end of a cable. The thickness of the epoxy bushing has been adapted to the need of insulation capacity thereof in relation to an earthed element formed by a wall of an electric station protruded by the device. And since epoxy sets with small geometric tolerances, there has been no problem of achieving the required thickness for applications within the intermediate and high voltage field.

Subsequently to the interconnecting of the contact part and cable, an outer further insulating member, normally made of rubber and earthed, has been positioned like a sleeve or sock surrounding the mating ends of the contact part and cable, and also surrounding the end of the insulation part of the electric connection device. Over time the shape and outer dimension of the insulating part and the shape and dimension of the further insulating member have become worldwide standard.

Also the canisters of fuse-canisters of prior art has made use of an insulation part made of solid epoxy of a thickness sufficient to prevent short circuits from appearing between the voltage-carrying part and an earthed wall of an electric station protruded by the canister.

In order to achieve a less costly manufacture of the connection device, it has been conceived to use a thermoplastic resin instead of a thermosetting resin which is the more expensive one. EP 1 496 576 shows an electric cable connection device that uses an insulation part made of a thermoplastic resin, preferably polyamide.

However, the thermoplastic resin has the disadvantage of not being easily and readily moulded to the desired thickness in view of the required insulation properties of the electric connection device. Accordingly, the insulation part shown in EP 1 496 576 has a thickness of only 3-5 mm, which is insufficient from an insulation point of view, and thus has to be supplemented by further insulation. Moreover, since the insulation is moulded directly onto the outer periphery of the contact part, the shape and outer dimension of the insulation part is constricted to the shape and dimension of the outer periphery of the contact part. Accordingly, the standardized outer dimension of the insulation part that has been adopted with regard to the use of a thermosetting resin, preferably epoxy, will not be easily achieved by means of a thermoplastic resin. Of course, the dimension of the contact part could be adapted in order to enable the thermoplastic resin to obtain the desired outer dimension through an economic moulding process, but such a measure would rather make the total manufacturing cost higher than was previously the case when epoxy was used as the insulation material.

THE OBJECT OF THE INVENTION

It is an object of the present invention to present a device for electric connection as initially defined the manufacture of which is cost saving while the design of the device is effectively preventing short circuits from appearing between the voltage-carrying part of the device and any earthed element passed or protruded by the voltage-carrying element. The device should have a design that makes it easy to combine or provide it with any further insulating means, such as an insulating gas, for further prevention of short circuits.

Further, the electric connection should have a design such that the device may readily mate with standardized further components of today. In particular, the design of the device should be such that the dimension of the outer periphery thereof will not be critical for the production costs thereof.

SUMMARY OF THE INVENTION

The object of the invention is achieved by means of the initially defined electric connection device, characterised in that, at least along a part of the length of the voltage-carrying part, the outer shell extends with a spacing 100 between its inner periphery and the outer periphery of the voltage-carrying part.

The object of the invention is also achieved by means of the initially defined method, characterised in that, at least along a part of the length of the voltage-carrying part, the outer shell is moulded with a spacing between its inner periphery and the outer periphery of the voltage-carrying part.

The device, and the voltage-carrying part thereof, is adapted be connected to and pass or protrude through an earthed frame or element. According to a preferred embodiment, the spacing between the inner periphery of the outer shell and the voltage-carrying part is in the region in which the voltage-carrying part passes or protrudes through to said frame or element.

According to a preferred embodiment the device comprises an insulating sleeve formed by a thermoplastic resin that tightly encloses the voltage-carrying part along at least a part of the length thereof. Thereby, a further improved insulation capacity can be obtained. The sleeve and the outer shell may be interconnected and may, preferably, be moulded together into one piece. Preferably, the sleeve covers or encloses the voltage-carrying part in a region in which the voltage-carrying part is adjacent any earthed element passed or protruded by the voltage carrying part, or in a region in which there would otherwise be an enhanced tendency of having a short circuit between voltage-carrying part and earthed element.

The outer shell may, preferably, define a tube or truncated cone, which in a first end is connected to the sleeve. At its outer periphery the outer shell may be provided with a means for the connection thereof to a surrounding frame such an earthed wall element. Such means may include a flange or the like, through which further fastening means such as bolts may be driven into said frame for the attachment of the device to the frame.

Preferably the sleeve extends along generally the entire length of said spacing as seen in the lengthwise direction of the voltage-carrying part. Thereby, the insulation properties of the device are further improved.

Preferably the device has a fastening means connected to the outer shell for the purpose of attaching the device to a grounded element, wherein at least one of the outer shell and the sleeve extends beyond the region of the fastening means as seen in the lengthwise direction of the voltage-carrying part. Thereby, the shell or the sleeve forms an electrically insulating barrier, and the risk of having a short circuit between the voltage-carrying element and such an earthed element, which might be a construction wall, is further reduced.

In order to further improve the electric insulation properties, it is preferred that the device comprises a further insulating medium provided in said spacing. Preferably, said medium is a pressurised, electrically insulating gas. However, for certain applications, said medium may comprise a solid material such as a rubber body.

According to a preferred embodiment, in order to further improve the electric insulation properties, the device comprises an annular barrier element extending between the contact part and the outer shell, preferably enclosing said spacing.

Preferably, the barrier element is formed by a thermoplastic resin. It may also, preferably, be connected to the sleeve and be moulded into one piece together with the sleeve and the outer shell.

According to a further embodiment, the device comprises a conductive shield. By means of such a shield the electric field generated between the high-voltage carrying element and the earthed element can be affected and modulated such that the risk of having a short circuit between the high-voltage carrying element and the earthed element is further reduced in said region.

Preferably, the conductive shield is embedded in the outer shell.

According to one embodiment the device defines a cable connection device wherein the voltage-carrying part comprises a conducting contact part having a contacting end adapted to be connected to a mating end of an electric cable. Preferably, the outer shell has a first end adjacent the contacting end of the contact part and a second distal end, and the sleeve is connected to the outer shell at the first end of the latter. Thereby, an improved mechanical strength of the device may be obtained, and also the insulation properties are promoted by such a design.

According to the invention, for the mechanical strength of the device, it is preferred that the device comprises a support member formed by a thermoplastic resin, connected with said outer shell and with the contact part and extending in said spacing. Preferably, said support member is formed by the sleeve. However, separate support members formed by fins or extending between contact part and outer shell or extending between sleeve and outer shell may be provided.

According to an alternative embodiment the insulation part defines a fuse-canister and the voltage-carrying part comprises a shield made of an electrically conducting material arranged for the purpose of suppressing an electric field inside the canister.

Preferably, the voltage-carrying part and the insulation part defines a fuse-receiving chamber, said chamber being gas-tightly sealed-off from said spacing between the voltage-carrying part and said outer shell.

When producing the inventive device, according to the invention, it is preferred that, together with the outer shell, there is also moulded a sleeve formed by a thermoplastic, said sleeve tightly enclosing the voltage-carrying part along at least a part of the length thereof, that the sleeve and the outer shell are connected to each other by being moulded as one single piece around the conducting part, that there is also moulded an annular barrier element extending between the voltage-carrying part and the outer shell and enclosing said spacing, that the outer shell and the barrier element are interconnected by being moulded together into one single piece, that the barrier element and the sleeve are interconnected by being moulded together into one piece.

The invention also includes an electric station or installation comprising a grounded wall element, characterised in that it comprises a device according to the invention passing through said wall element. In particular, the device according to the invention is attached to the wall element through fastening means provided on outer periphery of its outer shell. The inventive device is mounted in a position in which said spacing between the voltage-carrying part and the outer shell is crossed by the plane of the intersected wall. Preferably, the intersection plane between wall and device is perpendicular to longitudinal direction of the device. Preferably, the device has a generally rotational-symmetric cross-section. When the device defines a cable connection device, the mating contacting end of the contact part is unsheathed and exposed to the environment outside the electric station. When the device defines a fuse-canister, the inner chamber or space of the canister is accessible through an end of the canister exposed to the environment outside the electric station. A removable end cover may be provided at said end of the canister.

In general, the inventive device may be regarded as having the shape of a tube the outer wall of which is defined by said outer shell, and inside which there is arranged a voltage-carrying element with a spacing to said outer wall. In at least one of its ends the tube may be gas tightly sealed in order to provide a gas tight bushing or canister to be arranged in a wall of an electric station or installation. Said spacing should, however, communicate with the interior of said station, which, possibly, is filled with an electrically insulating gas.

Further features and advantages of the present invention will be described and defined in the following detailed description and in the annexed claims.

BRIEF DESCRIPTION OF THE DRAWINGS

Hereinafter preferred embodiments of the invention will be described by way of example with reference to the annexed drawing, on which.

DETAILED DESCRIPTION OF THE INVENTION

Figure 1:
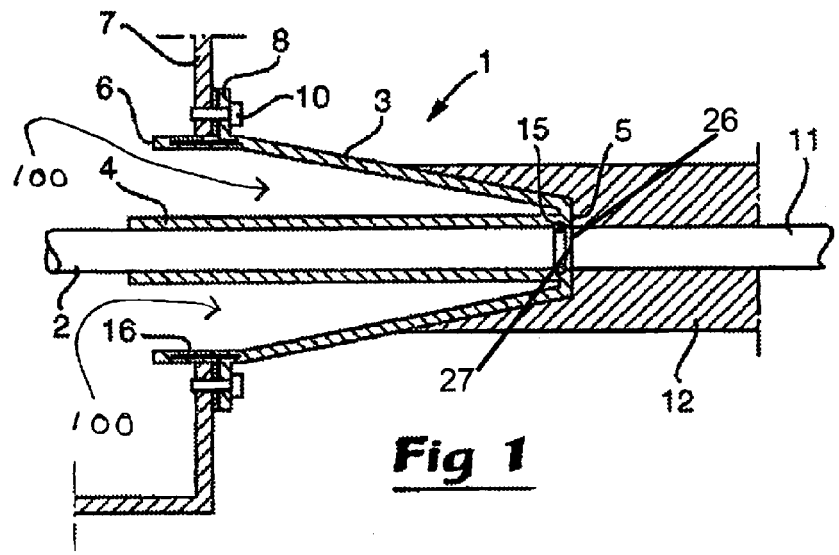
FIG. 1 is a cross-section of a first embodiment of the inventive device as connected to a mating end of a cable.

FIG. 1 shows a first embodiment of a device according to the invention. The device is a device for electric connection to an energy supply conductor for intermediate and high voltage, said conductor being defined by a cable. The device comprises an electrically insulating part 1 and an electrically conducting contact part 2. The insulating part 1 defines a bushing insulator, or wall tube insulator. The contact part 2 is elongated and has the shape of a rod. The insulating part 1 comprises an outer shell 3 and an inner sleeve 4. The sleeve 4 is tightly enclosing the contacting part 2 along a length thereof. The insulating part 1 mainly comprises a thermoplastic, such as a partly crystalline or partially aromatic poly amide or any other suitable thermoplastic. Preferably, the device is produced by means of a moulding process, by which the insulating part 1 is moulded in one single moulding step into one single piece, preferably onto the contact part 2.

The outer shell 3 defines a truncated cone, which in its narrow end 5 is connected to the sleeve 4. On its outer periphery, in the region of its wide end 6, the outer shell 3 is provided with a means for the connection thereof to a surrounding frame 7. Here the frame 7 is formed by a wall element, here the vertical wall of an electric connection station. The frame or wall element 7 is connected to earth. In this embodiment, the connection means comprises a flange 8 provided with a number of through holes 9 through which bolts 10 are secured into the frame 7. The electrically insulating part 1 is supposed to electrically insulate the contacting part 2 from the frame 7, thereby preventing any short circuit between contacting part 2 and frame 7. Therefore, either the outer shell 3 or the inner sleeve 4, or both of them, should preferably extend beyond the region of the frame 7 as seen in the lengthwise direction of the contact part, which is crosswise to the plane of the adjacent frame or wall 7. In the embodiment shown in FIG. 1 the outer shell 3 ends in said region but the inner sleeve 4 extends beyond said region. When the device is mounted in the frame 7, the contact part 2 protrudes through an opening in the frame or wall element 7 to be connected to a cable outside the inner spacing enclosed by the frame 7 and the inventive device itself.

In the embodiment of FIG. 1, the wall 7 is one of the walls of an electric connection station. Preferably, the inner space of the station is filled with a pressurised, electrically insulating gas such as SF6. The gas fills the space between the contact part 2 and the outer shell 3, especially important in the region in which the contact part 2 protrudes through the wall, thereby contributing to an improved electric insulation. The inventive device protrudes through the wall 7 and the first end 5 of the outer shell 3 of the insulating part 1 is located outside said inner space of the station. The part of the outer shell 3 that protrudes from the frame, including the first end 5 of the outer shell 3, will form a dividing wall element between the surrounding environment and the inner space of said station.

In FIG. 1, opposite to a first end of the contacting part 2 there is also shown the mating end 26 of a second contacting part formed by a cable or conductor part of such a cable 11 which is to be electrically connected to a contacting end 27 of the contact part 2 of the inventive device in the region of the first end 5 of the outer shell 5. An outer further insulating member 12, normally made of silicon rubber and earthed, has been positioned like a sleeve or sock surrounding the mating ends of the contact 2 part and cable 11, and also surrounding the first end 5 of the insulation part 1 of the electric connection device. The further insulating member 12 fits relatively tightly around the outer periphery of the outer shell 3 of the insulating part 1 of the device. It may be formed by two mating halves that are brought together from opposite sides of the contact part 2/outer shell 3, and that are clamped together by means of any outer clamping element (not shown).

Figure 2:
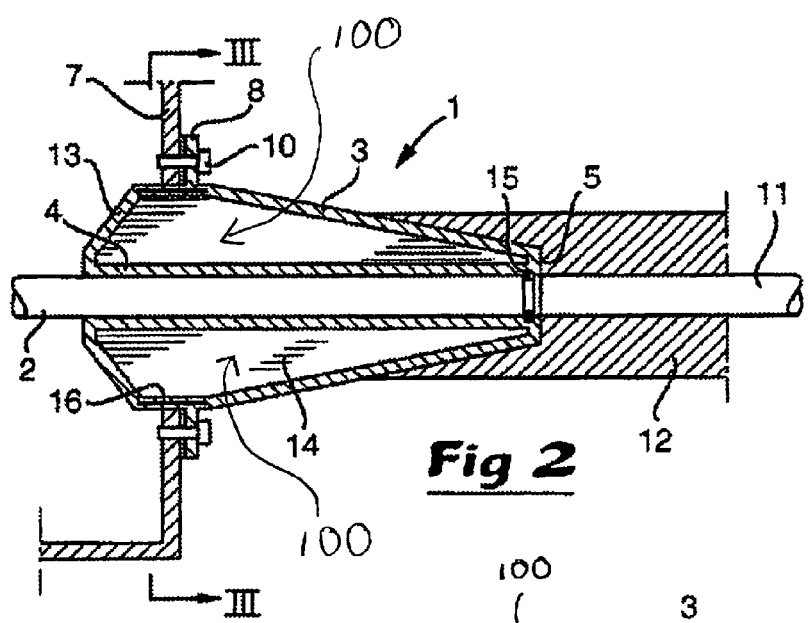
FIG. 2 is a cross-section of a second embodiment of he inventive device as connected to a mating end of a cable.

FIG. 2 shows a second embodiment according to which the insulating part 1 also comprises a barrier element 13 which encloses and delimits a space between the contact part 2 and the outer shell 3. Here the barrier element 13 comprises the same type of thermoplastic as the insulating part 1 and is produced in the same moulding processes as the latter. If there is an inner sleeve 4, as in this embodiment, the barrier element 13 is connected to the sleeve 4 and extends from the latter to the surrounding outer shell 3. Preferably, the barrier element 13 is located in the region of a second distal end of the outer shell 3. The space delimited by the contact part 2, the outer shell 3 and the barrier element is adjacent to the region of the surrounding frame 7. Preferably said space is provided, or filled, with a further electrically insulating means such as an electrically insulating pressurised gas, preferably SF6, or a silicon rubber element, in order to further prevent any short circuit between the contact part 2 and the surrounding frame 7. The barrier means may be regarded as a ring-shaped flange extending from the outer shell 3 to the inner sleeve 4 or, in the absence of such a sleeve, to the contact part 2 itself, thereby contributing to a sealing and tight enclosure of a space between the contact part 2 and the outer shell 3. However, as an alternative, said flange may extend only a part of the distance between outer shell and inner sleeve or contact part, departing from either the outer shell or the inner sleeve/contact part, the main task of the barrier element still being to prevent short circuits from appearing between the contact part and the grounded frame. The geometric shape of the contact part, outer shell, sleeve and frame, as well as the conceived voltages, will, in any case, be decisive for the specific design of the barrier element. The barrier element may also be comprised by a first part extending from the contact part/inner sleeve and a second part extending from the outer shell. The barrier element extends in a direction cross-wise but not necessarily perpendicular to the longitudinal direction of the contact part 2.

Figure 3:
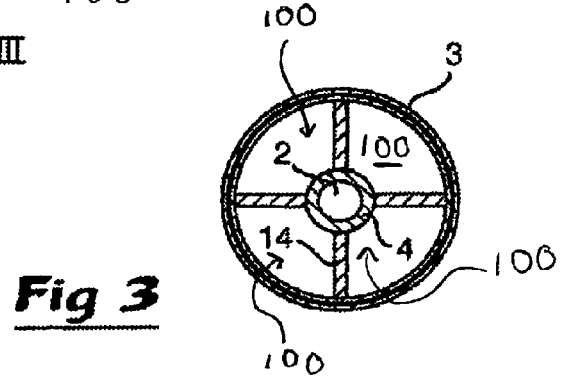
FIG. 3 is a cross-section, as seen from and end, of a further embodiment of the inventive device.

FIG. 3. shows a cross section of one embodiment of the device in accordance with III-III in FIG. 2. In this embodiment the device comprises a further supporting member 14 for supporting the structure of the insulating part 1, thereby contributing to a more rigid structure and a higher mechanical strength of the insulating part 1. Thereby, a more secure holding of the contact part may be achieved. The further supporting member 14 is formed by a plurality of struts or fins extending between the inner sleeve 4 and the outer shell 3. Preferably, the further supporting member 14 comprises the same material as the rest of the insulating part 1 and forms a part thereof. The further supporting member 14 may, preferably, be moulded together with the rest of the insulating part 1 and may, advantageously, form an integrated part thereof. The spaces or space between the individual struts or fins of the supporting member 14 may be filled with any suitable further electrically insulating means such as an electrically insulating gas like SF6 or any solid material such as silicon rubber, for the purpose of further preventing any short circuit between the contact part 2 and, for instance, the frame 7. Even though described in combination as combined with further components such as an inner sleeve 4 and a barrier element 13, the further supporting member 14 might as well be provided in the absence of such further components, then extending between contact part 2 and outer shell 3.

According to FIGS. 1 and 2, the device according to the invention is also provided with a sealing ring 15 for preventing any gap, and thus any leakage of e.g. gas, between the insulating part 1 and the contact part 2 during operation. The ring 15 is inserted between and in contact with the insulating part 1 and the contact part 2, preferably in the region of the first end of the insulating part 1/outer shell 3.

There is also provided a conductive shield 16 in the region of the outer shell 3, the main task of the conductive shield 16 being to suppress the electric field in the region of the connection between outer shell 3 and grounded frame 7 such that the possibility of having a short circuit between contact part 2 and frame 7 is further reduced. Here, the conductive shield 16 is a thin sheet of metal, conducting polymer or composite material, of annular shape and embedded in the outer shell 3. However, the shield may, alternatively, be exposed to the spacing between outer shell 3 and contact part 2. It may be connected to earth and may, preferably, be used as a voltage indication means for indicating the strength of the electric field.

Figure 4:
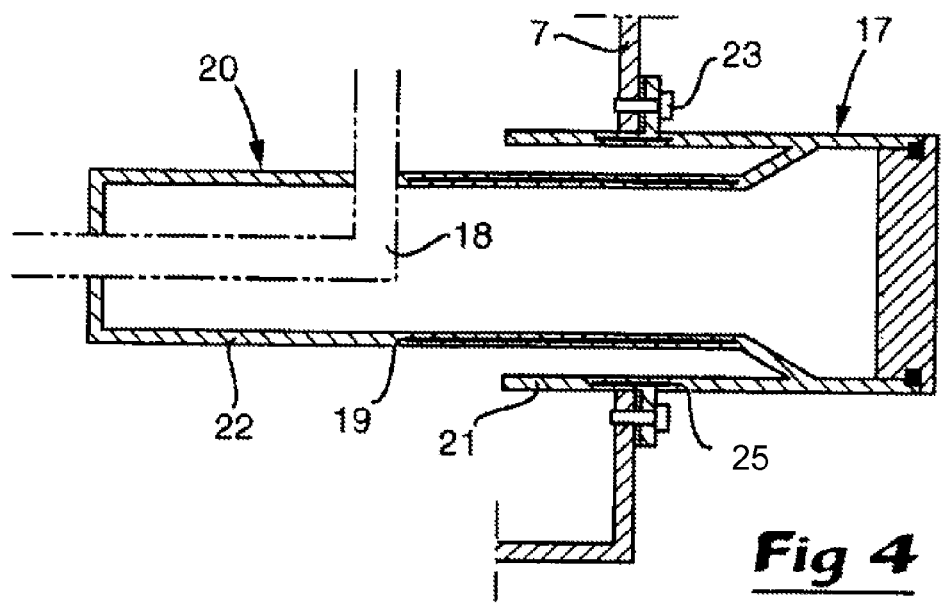
FIG. 4 is a cross-section of an alternative embodiment of the inventive device defining a fuse-canister.
Figure 5:
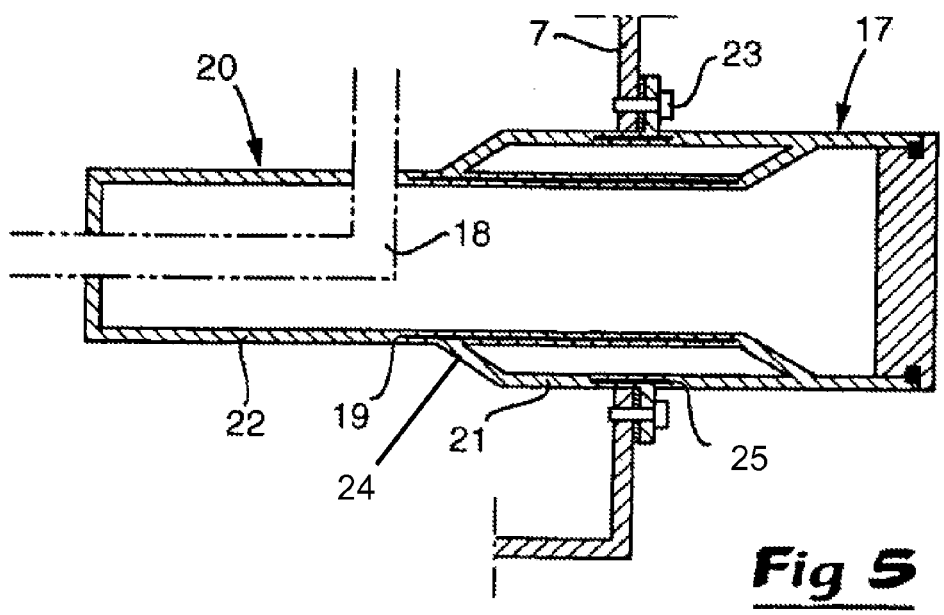
FIG. 5 is a cross-section of an alternative embodiment of the canister shown in FIG. 4.

FIGS. 4 and 5 show an embodiment of the inventive device by which the electric insulation part defines a canister 17 for the reception of a fuse. In FIGS. 4 and 5 the fuse has been omitted for the sake of clarity. It should be understood that a fuse is to be inserted into the canister 17 from the right in the figs., and that, when the fuse is in place, an electric conductor 18 will extend through the canister as shown by the dotted line in FIGS. 3 and 4. The conductor 18 passes through the canister wall at a short end thereof opposite to the end from which the fuse is to be inserted. It extends a distance through the interior of the canister 17 and passes through the mantle wall thereof.

The canister 17 is to be connected to a frame or wall element corresponding to the grounded frame 7 described earlier. The connection between frame 7 and canister 17 is beyond the site in which the electric conductor 18 passes through the mantle wall of the canister as seen from the left in FIGS. 3 and 4. The conductor does not pass through the plane of the intersecting frame.

In order to suppress the electric field generated by the conductor 18 in a region inside the canister extending from the region of the conductor 18 to the fuse-insertion end of the canister 17, there is provided a shield 19 made of an electrically conducting material embedded in the mantle wall of the canister 17. Said shield 19 may, as here, be made of a thin metal sheet or net of annular shape. The shield 19 extends through the canister wall in the region of the intersection plane between the frame 7 and the canister 17. Accordingly, it protrudes an opening in the grounded frame 7. Moreover, the shield 19 is in electric contact with the conductor 18 by being exposed to a through hole in the mantle wall through which the conductor 18 is to pass (even though not clearly shown in the figs.). During operation, when an intermediate or high voltage is applied to the conductor 18, the shield 19 will adopt the same voltage as the conductor 18.

The canister 17 could be described as being comprised by an electrical insulation part 20 mainly made of a thermoplastic polymer and a voltage carrying part 19 formed by the shield described above. In the intersection region or plane between the frame 7 and the voltage carrying part 19 it is of utmost importance to have satisfying insulation properties in order to prevent any short circuit from appearing between the voltage carrying part 19 and the frame 7. Therefore, the voltage-carrying part 19 is surrounded by an outer shell 21 formed by said insulation part 20, wherein, at least along a part of the length of the voltage-carrying part 19, the outer shell 21 extends with a spacing between its inner periphery and the outer periphery of the voltage-carrying part 19. In particular, the spacing should be provided in the region in which the voltage-carrying part 19 is to protrude through the frame 7, i.e. in the intersection plane between frame 7 and canister 17.

The voltage carrying part 19 may be embedded in or at least be supported by an inner sleeve 22 which is a part of the insulation part 20. Preferably, the inner sleeve 22 defines a tubular body into which a fuse is to be inserted and the interior of which is accessible from outside via the fuse insertion end thereof. The outer shell 21 is connected to the inner sleeve 22, preferably in the region of the fuse-insertion end of the canister. The outer shell 21 may be provided with any attachment means 23 for the attachment thereof to the frame 7.

The embodiment of FIG. 4 differs from that of FIG. 3 in the same way as the embodiment of FIG. 2 differs from that of FIG. 1, namely by the existence of a barrier element 24 between the outer shell 3 and the voltage carrying part 19 or inner sleeve 22. What has been stated with regard to said barrier element in with reference to FIG. 2 is also valid for the embodiment of FIG. 4, the only difference being that the voltage-carrying part is the contact part in the former case and the shield 19 in the present case.

Preferably, likewise to the embodiments of FIGS. 1-3, the spacing between outer shell 3 and inner sleeve 22 is filled with an electric insulation means, preferably an insulating gas mixture such as SF6.

The canister 17 of FIGS. 4 and 5 is preferably mounted such that it protrudes the wall of an electric installation like the one described with reference to FIGS. 1-3, the interior of the installation then being to the left of the frame or wall 7 as seen in FIGS. 4 and 5. The interior of the installation is, preferably, filled with an insulating gas such as SF6, and, accordingly, it is of utmost importance that the interior of the canister 20 is gas-tightly sealed off from the SF6-containing environment inside said installation.

Likewise to the embodiments of FIGS. 1-3, and for the same reasons, the device of FIGS. 4 and 5 is provided with a further shield 25, preferably embedded in the outer shell 3.

It should be remembered that the above description has been by way of example and that alternative embodiments will be obvious for a person skilled in the art, however without departing from the scope of the invention as defined in the annexed claims supported by the description and the annexed drawings.

The invention claimed is:

1. A device for electric connection to an energy supply conductor for intermediate and high voltage, comprising: an electrically conducting contact part (2) connected to an intermediate or high-voltage source, and an insulation part comprising a tubular inner sleeve that encloses a portion of the electrically conducting contact part along a portion of a length of the electrically conducting contact part, and an outer shell concentrically surrounding at least a portion of the inner sleeve such that a spacing (100) exists between the outer shell (3) and the inner sleeve (4) and which is open or closed on a side facing away from a narrow end (5) of the outer shell (3) connected to the tubular inner sleeve (4),
   the insulation part comprising a gas tight thermoplastic polymer, and
   the outer shell (3) in the shape of a truncated cone having the narrow end (5) thereof integrally-formed with the inner sleeve (4) at an opening through the inner sleeve (4) and at which the electrically-conducting contact part (2) has an end for connection with a mating end of a cable (11).

2. The device according to claim 1, wherein the electrically conducting contact part passes or protrudes through a grounded element, wherein the spacing between the inner periphery of the outer shell and the inner sleeve is located where the electrically conducting contact part passes or protrudes through the grounded element.

3. The device according to claim 1, wherein the inner sleeve extends along generally an entire length of said spacing as seen in a lengthwise direction of the electrically conducting contact part.

4. The device according to claim 1, further comprising:
   a fastener connected to a wide end the outer shell parallel to the inner sleeve, the fastener configured to attach the device to a grounded element, wherein at least one of the outer shell and the inner sleeve extends beyond a region of the fastener as seen in a lengthwise direction of the electrically conducting contact part.

5. The device according to claim 1, further comprising:
   a further insulating medium provided in said spacing.

6. The device according to claim 5, wherein said medium comprises a pressurized electrically insulating gas.

7. The device according to claim 1, further comprising:
   an annular barrier element (13) extending between the inner sleeve (4) and the outer shell (3) and enclosing said spacing (100), said annular barrier element (13) extending on the side facing away from the narrow end (5) of the outer shell (3).

8. The device according claim 7, wherein the annular barrier element comprises a thermoplastic resin.

9. The device according to claim 1, further comprising:
   a conductive shield on or in the outer shell.

10. The device according to claim 9, wherein the conductive shield is embedded in the outer shell.

11. The device according to claim 10, wherein the conductive shield (16) is embedded in a wide end (6) of the outer shell (3) parallel to the inner sleeve (4).

12. The device according to claim 1, further comprising:
   a support member formed by a thermoplastic resin, connected with said outer shell and with the inner sleeve and extending in said spacing.

13. The device according to claim 1, additionally comprising
   a sealing member (15) is inserted between the inner sleeve (4) and electrically-conducting part (2) and in contact with the electrically conducting part (2) and insulation part (1) in the region of the narrow end (5) of the outer shell (3), to prevent leakage of gas.

14. The device according to claim 1, wherein the thermoplastic polymer is a partially crystalline or aromatic polyamide and additionally comprising an insulating gas mixture of SF6 filling the spacing (100) between the inner sleeve (4) and outer shell (3).

15. The device according to claim 1, wherein the narrow end of the outer shell (3) terminates a radial distance spaced from the inner sleeve (4) and is integrally-formed and connected with the inner sleeve (4) by a radially-extending, annular disc at the opening through the inner sleeve (4).

16. A method of producing a device for electric connection to an energy supply conductor for intermediate and high voltage, the method comprising:
   forming an integral, single piece insulation part comprising a conical outer shell and a tubular inner sleeve by molding a gas-tight thermoplastic resin around an electrically conducting contact part connected to an intermediate or high voltage source, wherein
   the inner sleeve is formed to enclose a portion of the electrically conducting contact part along a portion of a length of the electrically conducting contact part, the conical outer shell and tubular inner sleeve define a spacing (100) between the conical outer shell (3) and the tubular inner sleeve (4) and which is open or closed on a side facing away from an end of the conical outer shell (3) connected to the tubular inner sleeve (4), and the conical outer shell (3) and tubular inner sleeve (4) are integrally formed at the end of the conical outer shell (3) which is located at an opening through the inner sleeve where the electrically-conducting contact part (2) has an end for connection with a mating end of a cable.

17. The method according to claim 16, further comprising:
   integrally molding together with the outer shell and inner sleeve, an additional annular barrier element extending between the electrically conducting contact part and the outer shell and enclosing said spacing.

18. The method according to claim 16, further comprising:
   providing a further electrically insulating medium in said spacing.

19. The method according to claim 18, wherein said medium comprises a pressurized, electrically insulating gas.

20. A device for electric connection to an energy supply conductor for intermediate and high voltage, comprising
   an electrically conducting contact part connected to an intermediate or high-voltage source,
   an insulation part comprising an inner sleeve that encloses a portion of the electrically conducting contact part along a portion of a length of the electrically conducting contact part, and an outer shell surrounding at least a portion of the inner sleeve such that a spacing (100) exists between the outer shell (3) and the inner sleeve (4) and which is open or closed on a side facing away from an end of the outer shell (3) connected to the tubular inner sleeve (4), wherein
   the insulation part comprises a gas tight thermoplastic polymer, and
   a sealing member (15) is inserted between the inner sleeve (4) and electrically-conducting part (2) and in contact with the electrically conducting part (2) and insulation part (1) to prevent leakage of gas.

* * * * *